United States Patent [19]

Lambrech

[11] 4,393,123

[45] Jul. 12, 1983

[54] FUEL CELL TEMPERATURE CONTROL ASSEMBLY

[75] Inventor: Matthew A. Lambrech, Sherman, Conn.

[73] Assignee: Energy Research Corporation, Danbury, Conn.

[21] Appl. No.: 344,374

[22] Filed: Feb. 1, 1982

[51] Int. Cl.³ .............................................. H01M 8/04
[52] U.S. Cl. ...................................... 429/24; 429/34; 429/35
[58] Field of Search .............................. 429/24, 34, 35

[56] References Cited

U.S. PATENT DOCUMENTS 4,310,604  1/1982  Marchetti ............................. 429/17

Primary Examiner—Anthony Skapars

[57] ABSTRACT

A fuel cell temperature control assembly comprising inner and outer valve members, the outer valve member having first and second ports adapted to receive fresh supply gas and heated flue gas, respectively, and a third port displaced from the first and second ports and adapted to be connected to the input port of a fuel cell, the inner valve member having input and output coupling ports and sealing means for ensuring coupling of the first and second ports of the outer valve member to the third port of the outer valve member only through the input and output coupling ports of the inner valve member.

15 Claims, 2 Drawing Figures

FUEL CELL TEMPERATURE CONTROL ASSEMBLY

BACKGROUND OF THE INVENTION

This invention pertains to fuel cells and, in particular, to an assembly for controlling the temperature of such cells.

In the operation of a fuel cell, it is general practice to provide heated flue gas to the cell in quiescent state in order to bring the cell to operating temperature. Supply of the flue gas may be realized by use of an external heated supply whose output is fed to the cell through a damper which is closed by a bimetallic spring when the cell is brought to operating temperature. It also might be accomplished by disposing an electrical heater in the supply duct of the cell, again the heater being turned off when the cell operating temperature is reached.

Once the cell is brought to operating temperature, it is usually maintained there by a further temperature control system which selectively controls the amount of supply gas being delivered to the cell as well as the amount of exhausted gas being recirculated through the cell. U.S. Pat. No. 4,310,604, assigned to the same assignee hereof, discloses an assembly of this type in which a passive element in the form of a charged bellows directly senses the cell temperature and operates a damper assembly which apportions the amount of fresh supply gas and the amounts of exhausted gas carried out of the cell and recirculated through the cell in order to maintain the cell at a desired operating temperature.

While the above systems provide effective cell temperature control, research is still being conducted for improved systems of this type.

It is an object of the present invention to provide an improved temperature control system.

It is a further object of the present invention to provide an assembly for temperature control which operates to control start-up flue gas delivery as well as supply gas delivery during cell operation.

It is a further object of the present invention to provide a simple compact valve assembly for providing fuel cell temperature control from start-up to operating mode.

SUMMARY OF THE INVENTION

In accordance with the principles of the present invention, the above and other objectives are realized in an assembly comprising an outer valve member having first and second ports adapted to receive fresh supply gas and heated flue gas, respectively, and a third port displaced from the first and second ports and adapted to be connected to the input port, of a fuel cell. An inner valve member is movably mounted within the outer valve member and provides selective coupling of the first and second ports of the outer valve member to the third port of that member. An input coupling port in the inner valve member when at the positions of the first and second ports overlaps same, while an output coupling port of the inner valve member communicates with the third port of the outer valve member. Sealing means prevents coupling of the first and second ports to the third port of the outer valve member other than through the input and output coupling ports of the inner valve member.

Movement of the inner valve member is such as to move the input coupling port toward the first port and away from the second port as cell temperature increases, thereby providing the desired temperature control.

BRIEF DESCRIPTION OF THE DRAWING

The above and other features and aspects of the present invention will become more apparent upon reading the following detailed description in conjunction with the accompanying drawings, in which.

DETAILED DESCRIPTION

Figure 1:
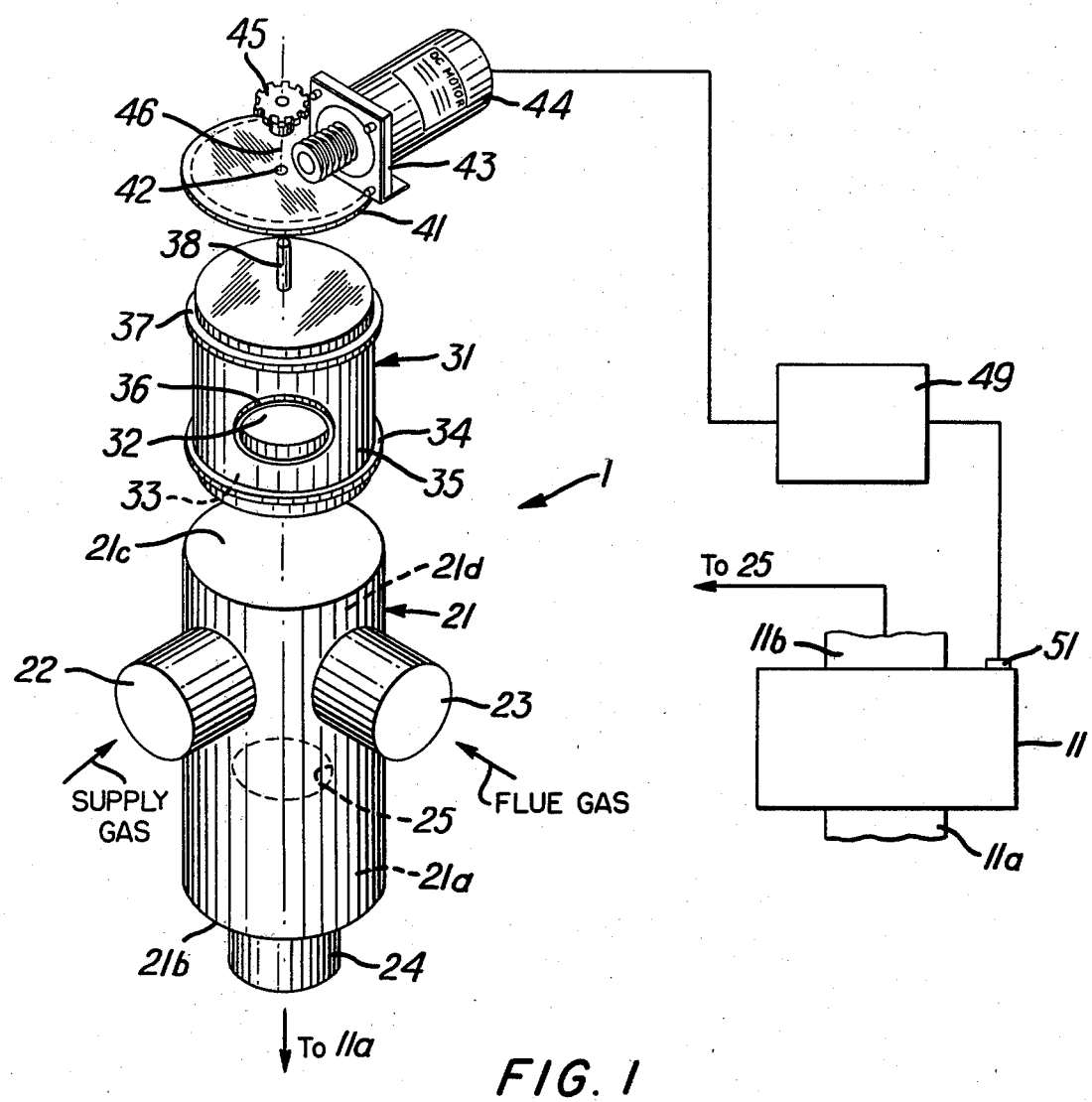
FIG. 1 shows an exploded view of a temperature control assembly in accordance with the principles of the present invention.

In FIG. 1, an assembly 1 for effecting temperature control of a fuel cell 11 is shown. The assembly 1 provides selective coupling of fresh supply process gas, heated flue gas, and fuel cell exhaust gas to the fuel cell 11.

An outer valve cylinder 21 is provided with first and second ports 22 and 23 which are adapted to receive the fresh supply gas and heated flue gas, respectively. As shown, the ports 22 and 23 are circumferentially displaced at a common axial position along the length of the cylinder wall.

Third and fourth ports 24 and 25 are provided in the cylinder section 21a axially displaced in a first direction from the ports 22 and 23. The ports 24 and 25 are adapted to be connected to the input and output ports 11a and 11b, respectively, of the fuel cell 11. As shown, the port 24 is disposed in the end wall 21b of the lower section 21a, while the port 25 is disposed in the section sidewall and is axially displaced from the end wall in a direction opposite the first direction.

An inner valve cylinder 31 is rotably mounted in the outer cylinder 21 and includes an input coupling port 32 which selectively couples with the outer cylinder ports 22 and 23 and an output coupling port 33 which couples with the outer cylinder section 21a. In the present case, the inner cylinder 31 is mounted so as to extend into the cylinder 21 in the first direction to a point above the port 25, so that the gases entering such port are not blocked and are free to enter the cylinder section 21a. Mounting of the inner cylinder 31 is through an opening 21c in the top of outer cylinder 21.

Sealing means is further provided to ensure that coupling of gas to the cylinder valve section 21a is only through the inner and outer coupling ports 32 and 33 and only with the particular ones of the ports 22 and 23 desired. More particularly, first and second sealing rings 34 and 37 are disposed on the outer cylindrical surface of the inner cylinder sidewall 35 below and above the coupling port 32 and inhibit gas from either port 22 or 23 from bypassing the port 32 and entering either the lower cylinder section 21a or the upper cylinder section 21d. The periphery of port 32 is further provided with a grommet seal 36 which precludes gas from the area of either of the ports 22 or 23 not in overlapping relationship with port 32 from entering port 32. The sealing rings 34, 37 and grommet seal 36 thus provide the above-mentioned desired coupling amongst the ports 22, 23 and the cylinder section 21a, i.e., coupling only through input and output coupling ports 32 and 33 and with the desired one of the ports 22 and 23.

A stem 38 attached to the top end of the inner valve 31 passes through a slot 42 in a top cover 41 which closes the opening 21c. Mounted on the cover 41 via bracket 43 is a motor 44 which drives a gear 45 to which is attached the stem 38 via a pin 46.

Figure 2:
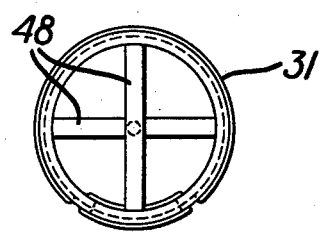
FIG. 2 illustrates a bottom view of the inner cylinder valve of the assembly of FIG. 1.

Rotation of the valve 31 by the motor 44 is stabilized by crossed stabilizer bars 48 (see, FIG. 2) disposed within the valve. The degree of rotation of the motor, in turn is controlled by a standard control circuit 49 fed by a temperature sensor 51 whose output signal is related to temperature of fuel cell 11.

In operation, at start up of the cell 1, the inner valve 31 is positioned by the motor 44 via the control circuit 49 and sensor 51 so that the inner coupling port 32 overlaps totally the flue gas port 23. Heated flue gas is thereby delivered to the lower cylinder section 21a by the outer coupling port 33 and from there into the fuel cell 11 via the valve port 24.

As the cell 11 begins to heat up, the motor 44, control circuit 49 and sensor 51 rotate the inner valve so that the port 32 is moved out of total alignment with the port 23, thereby coupling less of the heated flue gas to the cell 11. This process continues causing partial overlap of the ports 22 and 23 with the port 32, whereby a mixture of supply gas and heated flue gas are provided to the cell. Finally, when the cell reaches its operating temperature, the cylinder valve 32 has been rotated to a position in which the port 22 is totally overlapped and the port 23 not overlapped. At this point, the cell no longer needs to be heated by the flue gas and it only needs fresh supply gas which it receives through port 22.

It should be noted that the input and output ports 11a and 11b can either be ports associated with the oxidant supply gas or the fuel supply gas of the cell 11. For each case, the supply gas feeding the port 22 of the outer valve can be selected accordingly.

In all cases, it is understood that the above-described arrangements are merely illustrative of the many possible specific emodiments which represent applications of the present invention. Numerous and varied other arrangements can be readily devised without departing from the spirit and scope of the invention.

What is claimed is:

1. An assembly for use in controlling the temperature of a fuel cell having input and output ports for receiving supply gas and discharging exhaust gas, said assembly comprising:
   an outer valve member including first, second, and third ports, said first and second ports being spaced and adapted to receive supply gas at first and second temperatures, respectively, said first temperature being higher than said second temperature, said third port being displaced from said first and second ports and being adapted to connect to said input port of said fuel cell;
   an inner valve cylinder having an input coupling port and an output coupling port, said inner valve member being movably mounted in said outer valve member such that said input coupling port in the position of said first and second ports overlaps said first and second ports, respectively, and such that said output coupling port communicates with said third port;
   and means for sealing said first and second ports from said third port such that coupling between said first and second ports and said third port occurs only through said input and output coupling ports.

2. An assembly in accordance with claim 1 wherein: said outer valve member includes a fourth port communicating with said third port and adapted to be connected to said output port of said fuel cell.

3. An assembly in accordance with claim 1 wherein:
   said first and seconds ports are circumferentially displaced;
   said third port is displaced from said first and second ports in a first axial direction;
   said inner valve member is rotatively mounted in said outer valve member such that said output coupling port opens into the outer valve member section axially displaced in said first direction from said first and second ports;
   and said sealing means seals said first and second ports from said outer valve member section such that coupling between said first and second ports and said outer valve member section occurs only through said input and output coupling ports.

4. An assembly in accordance with claim 3 wherein: said inner and outer valve members are cylindrical.

5. An assembly in accordance with claim 3 wherein: said outer valve member includes a fourth port displaced axially in said first direction from said first and second ports and adapted to be connected to said output port of said fuel cell.

6. An assembly in accordance with claim 3 wherein:
   said first and second ports are in the sidewall of said outer valve member;
   and said input coupling port is in the sidewall of said inner valve member.

7. An assembly in accordance with claim 6 wherein: said sealing means comprises a first sealing ring disposed in surrounding relation to the outer surface of said sidewall of said inner valve member and sealingly engaging the inner surface of the sidewall of the outer valve member at a position axially displaced in said first direction from said first and second ports by an amount less than both said third port and said output coupling port.

8. An assembly in accordance with claim 6 wherein: said output coupling port is disposed at an end wall of said inner valve member.

9. An assembly in accordance with claim 3 wherein: said third port is at a position axially displaced in said first direction from position at which said output coupling port opens into said outer valve member section.

10. An assembly in accordance with claim 8 wherein: said third port is in an end wall of said outer valve member.

11. An assembly in accordance with claim 6 wherein: said sealing means includes a second sealing ring disposed in surrounding relation to the outer surface of said sidewall of said inner valve member defining the periphery of said input coupling port and sealingly engaging the inner surface of said sidewall of said outer valve member.

12. An assembly in accordance with claim 10 wherein:
   said sealing means includes a third sealing ring disposed in surrounding relation to the outer surface of said sidewall of said inner valve member and sealingly engaging the inner surface of the sidewall of said outer valve member at a position axially displaced in a direction opposite said first direction from said first and second ports and said input coupling port.

13. An assembly in accordance with claim 1, 2, 3, 7, or 12 further comprising:
   means responsive to the temperature of said cell;
   means responsive to said temperature responsive means for rotating said inner valve member, said rotating means rotating said inner valve member so as to move said input coupling port toward said second port and away from said first port when said temperature responsive means indicates an increase in said temperature.

14. An assembly in accordance with claim 1 wherein: said supply gas received by said first and second ports is oxidant supply gas.

15. An assembly in accordance with claim 1 wherein: said sealing means includes a sealing ring disposed in surrounding relation to the outer surface of the sidewall of said inner valve member and in sealing engagement with the inner surface of the sidewall of said outer valve member at a position which seals said first and second ports from said third port.

* * * * *